United States Patent [19]

Kyura et al.

[11] Patent Number: 5,162,716
[45] Date of Patent: Nov. 10, 1992

[54] TRACKING CONTROL METHOD BETWEEN TWO SERVO SYSTEMS

[75] Inventors: Nobuhiro Kyura; Yoshiji Hiraga, both of Iruma, Japan

[73] Assignee: Kabushiki Kaisha Yaskawa Denki Seisakusho, Kitakyushu, Japan

[21] Appl. No.: 674,160

[22] Filed: Mar. 25, 1991

[30] Foreign Application Priority Data

Mar. 27, 1990 [JP] Japan .................. 2-80328

[51] Int. Cl.⁵ .............................. G05B 11/32
[52] U.S. Cl. .................................. 318/625
[58] Field of Search ............ 318/625, 571, 39, 569, 318/609, 610, 85, 632, 618

[56] References Cited

U.S. PATENT DOCUMENTS

| | | | |
|---|---|---|---|
| 4,353,018 | 10/1982 | Kohzai et al. | 318/571 |
| 4,571,687 | 2/1986 | Fukuyama et al. | 318/571 X |
| 4,617,498 | 10/1986 | Ruppert | 318/85 |
| 4,629,956 | 12/1986 | Nozawa et al. | 318/625 |
| 4,656,405 | 4/1987 | Kiya et al. | 318/571 |
| 4,761,597 | 8/1988 | Sasaki | 318/625 |
| 4,879,660 | 11/1989 | Asakura et al. | 318/39 X |
| 5,010,286 | 4/1991 | Nakamura et al. | 318/571 |

FOREIGN PATENT DOCUMENTS 63-268011 11/1988 Japan .
3-121507 5/1991 Japan .

Primary Examiner—William M. Shoop, Jr.
Attorney, Agent, or Firm—Oblon, Spivak, McClelland, Maier & Neustadt

[57] ABSTRACT

First, second, and third compensation signals are generated from the information on the position and speed of the first servo system having a speed control loop as a minor loop. The speed error of the speed control loop of the second servo system which has the speed control loop as a minor loop and uses a signal obtained by sampling the position detection signal, executing a digital calculation process on the sampled signal to obtain a speed signal and integrating the speed signal as a position command signal or a signal obtained by sampling the position detection signal of the first servo system and executing a digital calculation process on the sampled signal as a position command signal is compensated by the first, second and third compensation signals. Thus, even in cases where the acceleration and deceleration of the first servo system are executed even at constant power, positional synchronizing error is not generated. The accurate positional synchronizing control between two servo systems having different response characteristics can be achieved.

24 Claims, 4 Drawing Sheets

5,162,716

TRACKING CONTROL METHOD BETWEEN TWO SERVO SYSTEMS

FIELD OF THE INVENTION

The present invention relates to a tracking control method between two servo systems whereby the position detection signal of the first servo system having a speed control loop as a minor loop is sampled and subjected to a digital calculation to obtain a speed signal and the speed signal is integrated and the resultant signal is set to a position command signal of the second servo system having a speed control loop as a minor loop or said position detection signal is sampled and subjected to a digital calculation and the resultant signal is set to said position command signal, thereby allowing the second servo system to track the positional response of the first servo system.

DESCRIPTION OF THE PRIOR ART

Conventional techniques for this kind of tracking control method between two servo systems have been disclosed in Japanese Patent Application Nos. 101803/87 and 235392/89. In the methods disclosed in both of the above Official Gazettes, servo system of the first axis is limited only to the linear acceleration and deceleration. Namely, in the case where the speed pattern of the first axis servo system has a trapezoidal shape, even if there is a disturbance in the first axis servo system, the second axis servo system will track the first axis servo system while maintaining positional synchronization between the two systems.

To effectively use the driving power capability of the servo system, the linear acceleration/deceleration, in other words, a control to keep the torque of a servo drive motor constant is insufficient and it is necessary to provide a control to keep supply power for the servo drive motor constant (hereinafter referred to as constant power control).

The increasing curve and decreasing curve of the speed in the case of constant power control can be approximated by a quadratic function of time and its position command curve can be given by a cubic function of time.

According to conventional positional synchronizing control methods which are known also as tracking control methods, a control to completely eliminate positional synchronizing errors can be achieved in cases where the position command curve of the first axis servo system is a quadratic curve of time. However, there is the drawback that positional synchronizing error cannot be reduced to predetermined errors or less if such a position command curve is a cubic curve of time.

SUMMARY OF THE INVENTION

It is an object of the invention to provide a tracking control method between two servo systems whereby position synchronizing errors can be eliminated even in cases where the acceleration and deceleration of the first axis servo system are executed at constant power.

According to the first tracking control method between two servo systems of the invention, a first compensation signal according to speed information obtained from the position detection signal of the first servo system, a second compensation signal according to speed information obtained from the command signal of the speed of the first servo system, and a third compensation signal according to the derivative of the speed information are generated and the speed error of the speed control loop of the second servo system is compensated by the first, second and third compensation signals.

According to the second tracking control method between two servo systems of the invention, a first compensation signal according to speed information obtained from a position detection signal of the first servo system, a second compensation signal according to speed information obtained from the command signal of the position of the first servo system, and a third compensation signal according to the derivative of the speed information are generated and the speed error of the speed control loop of the second servo system is compensated by the first, second and third compensation signals.

According to the third tracking control method between two servo systems of the invention, a first compensation signal according to speed information obtained from the position detection signal of the first servo system, a second compensation signal according to speed information obtained from the command signal of the speed of the first servo system and speed information obtained from the command signal of the position of the first servo system, and a third compensation signal according to the derivative of the speed information are generated and the speed error of the speed control loop of the second servo system is compensated by the first, second and third compensation signals.

According to the fourth tracking control method between two servo systems of the invention, a first compensation signal according to the position detection signal of the first servo system, a second compensation signal according to speed information obtained from the command signal of the speed of the first servo system, and a third compensation signal according to the derivative of the speed information are generated and the speed error of the speed control loop of the second servo system is compensated by the first, second and third compensation signals.

According to the fifth tracking control method between two servo systems of the invention, a first compensation signal according to the position detection signal of the first servo system, a second compensation signal according to speed information obtained from a command signal of the position of the first servo system, and a third compensation signal according to the derivative of the speed information are generated and the speed error of the speed control loop of the second servo system is compensated by the first, second and third compensation signals.

According to the sixth tracking control method between two servo systems of the invention, a first compensation signal according to the position detection signal of the first servo system, a second compensation signal according to speed information obtained from the command signal of the speed of the first servo system and speed information obtained from the command signal of the position of the first servo system, and a third compensation signal according to the derivative of the speed information are generated and the speed error of the speed control loop of the second servo system is compensated by the first, second and third compensation signals.

FIGS. 2 to 5 are principle diagrams of the invention.

The upper loop of the stage in each of the diagrams shows the first servo system (for slow response system) and the loop of the lower stage denotes the second servo system (for quick response system). $K_s$ and $K_z$ denote proportional gains of position loops; $G_s$ and $G_z$ transfer functions; f(t) a speed command;

$$\int_o^t f(\tau)d\tau$$

a position command; $\dot{X}_s$ and $\dot{X}_z$ speeds; $X_s$ and $X_z$ positions; k a constant; $K_1$ a compensation coefficient for a response; $K_2$ a compensation coefficient for the speed; $K_3$ a compensation coefficient for a differentiated value of the speed command; and D a sampling circuit.

The example in FIG. 2 corresponds to the first method of the invention. The first compensation signal is obtained by multiplying the compensation coefficient $K_1$ by the differentiated value of the position command $X'_s$ of the second servo system obtained by sampling the position detection signal $X_s$ of the first servo system. The second compensation signal is obtained by multiplying the compensation coefficient $K_2$ by the speed command f(t) of the first servo system. The third compensation signal is obtained by multiplying the compensation coefficient $K_3$ by the differentiated value (derivative) of the speed command f(t). The speed error of the speed control loop of the second servo system is compensated by adding the first, second and third compensation signals.

The example in FIG. 3 corresponds to the second method of the invention. The first compensation signal is obtained by multiplying the compensation coefficient $K_1$ by the differentiated value of the position command $X'_s$ of the second servo system obtained by sampling the position detection signal $X_s$ of the first servo system. The second compensation signal is obtained by multiplying the compensation coefficient $K_2$ by the differentiated value of the position command $$\int_o^t f(\tau)d\tau$$

of the first servo system. The third compensation signal is obtained by multiplying the compensation coefficient $K_3$ by the differentiated value (derivative) of the differentiated value of the position command $$\int_o^t f(\tau)d\tau.$$

The speed error of the speed control loop of the second servo system is compensated by adding the first, second and third compensation signals.

The example in FIG. 4 corresponds to the fourth method of the invention. The first compensation signal is obtained by multiplying the compensation coefficient $K_1$ by the speed command $\dot{X}'_s$ of the second servo system obtained by sampling and differentiating the position detection signal $X_s$ of the first servo system. The second compensation signal is obtained by multiplying the compensation coefficient $K_2$ by the speed command f(t) of the first servo system. The third compensation signal is obtained by multiplying the compensation coefficient $K_3$ by the differentiated value (derivative) of the speed command f(t). The speed error of the speed control loop of the second servo system is compensated by adding the first, second and third compensation signals.

The example in FIG. 5 corresponds to the fifth method of the invention. The first compensation signal is obtained by multiplying the compensation coefficient $K_1$ by speed command $\dot{X}'_s$ of the second servo system obtained by sampling and differentiating the position detection signal $X_s$ of the first servo system. The second compensation signal is obtained by multiplying the compensation coefficient $K_2$ by the differentiated value of the position command $$\int_o^t f(\tau)d\tau$$

of the first servo system. The third compensation signal is obtained by multiplying the compensation coefficient $K_3$ by the differentiated value (derivative) of the differentiated value of the position command $$\int_o^t f(\tau)d\tau.$$

The speed error of the speed control loop of the second servo system is compensated by adding the first, second and third compensation signals.

In the third and sixth tracking control methods of the invention, the second compensation signal is obtained from the speed command f(t) of the position command $$\int_o^t f(\tau)d\tau$$

of the first servo system. The third and sixth methods are not shown by control block diagrams and their descriptions are omitted here. Alternatively, the compensation of the speed error may also be executed by compensating the gain of the control apparatus (corresponds to the transfer function G) for outputting the speed command signal of the speed control loop by the sum of the first, second and third compensation signals.

The example in FIG. 3 will now be described in detail.

It has been confirmed from experiments that the construction of FIG. 3 is very effective as a positional synchronizing control method (a tracking control method) between two servo systems. In the construction, the setting of the values of the compensation coefficients $K_1$, $K_2$, and $K_3$ is particularly important for the present method. In the optimum state, the tracking error from an ideal straight line can be set to a value within a range of about ±20 pulses. The compensation coefficients $K_1$, $K_2$, and $K_3$ necessary to accomplish the optimum adjustment will now be analytically obtained as shown below.

It is well known that a transient state can be generally disregarded with respect to both the S axis (the first servo system) and the Z axis (the second servo system) in the period of the synchronizing control.

On the other hand, the execution of the tracking control can be shown by the following equations in the block diagram.

$$X_S(t) = f_S(f(t))$$

-continued $$X_Z(t) = f_Z(X_S(t), \dot{X}_S(t), y'(t), k)$$
$$= f_Z(y(t))$$

when $f_s(t)$: input to the S axis
$y(t)$: synthetic input to the Z axis
the following equation (1) must be obtained.

$$X_Z(t) = kX_S(t) \tag{1}$$

In the power constant control, the following equation (2) must be set.

$$f_s(t) = At^3 + Bt^2 + Ct + D \tag{2}$$

Assuming that the equation (2) is set to a forced input, a general solution of the following differential equation (3) is obtained by the equation (4).

$$\dot{x}_S + K_S x_S = K_S f_s(t) \tag{3}$$

$$x_S(t) = At^3 + \left(B - \frac{3A}{K_S}\right)t^2 + \tag{4}$$

$$\left\{C - \frac{1}{K_S}\left(B - \frac{3A}{K_S}\right)\right\}t + D -$$

$$\frac{1}{K_S}\left\{C - \frac{2}{K_S}\left(B - \frac{3A}{K_S}\right)\right\}$$

wherein $x_s$ and $\dot{x}_s$ denote the position and derivative, respectively, or $x_s$.

When the compensation signals are input in FIG. 2, a command $f_Z(t)$ to the Z axis is expressed by the following equation.

$$f_Z(t) = kAt^3 + k\left[\left(B - \frac{3A}{K'_S}\right) + 3AK_1 + 3AK_2\right]t^2 + \tag{5}$$

$$k\left[\left\{C - \frac{2}{K'_S}\left(B - \frac{3A}{K'_S}\right)\right\}+\right.$$

$$2K_1\left(B - \frac{3A}{K'_S}\right) + 2BK_2 + 6A\right]t +$$

$$k\left[D - \frac{1}{K'_S}\left\{C - \frac{2}{K'_S}\left(B - \frac{3A}{K'_S}\right)\right\}+\right.$$

$$\left.K_1\left\{C - \frac{2}{K'_S}\left(B - \frac{3A}{K'_S}\right)\right\}\right]$$

The relation between the true response $X_S(t)$ and the measured response $X'_S(t)$ is shown in FIG. 6.

Since $X_s(t)$ is read in the sampling circuit D in FIG. 2 at a cycle of the system clock, a delay in the calculation of $X'_s(t)$ occurs. This delay brings about a decrease in proportional gain $K_s$.

The reduced proportional gain is denoted as $K'_S$ and the relation between $K'_S$ and the proportional gain $K_S$ will be obtained. A speed waveform (FIG. 6) is now considered to make the induction of the equations easy. FIG. 6 shows the general relations among the command, the response, and the measured waveform. $\Delta t$ denotes the time (about 2 to 4 msec) which is required to read.

From FIG. 6, it is obvious that the following relation is satisfied in the stationary state. ($\alpha$ is the coefficient of a command input.)

$$2\alpha(t - \Delta t) - \frac{2\alpha}{K_S} = 2\alpha t - \frac{2\alpha}{K'_S} \tag{6}$$

From the equation (6), $$K'_S = mK_S \tag{7}$$

where, $$m = \frac{1}{1 + \Delta t K_S}$$

is obtained. Therefore, $X'_S(t)$, the detected position signal of the steady state response, is expressed by the following equation by replacing all $K_s$ terms in equation (4) by $K_s'$ terms.

$$X'_S(t) = At^3 + \left(B - \frac{3A}{K'_S}\right)t^2 + \tag{8}$$

$$\left\{C - \frac{2}{K'_S}\left(B - \frac{3A}{K'_S}\right)\right\}t +$$

$$D - \frac{1}{K'_S}\left\{C - \frac{2}{K'_S}\left(B - \frac{3A}{K'_S}\right)\right\}$$

When the compensation coefficients $K_1$, $K_2$, and $K_3$ are obtained so as to satisfy the relation of the equation (1) for the stationary solution in the case where $f_Z(t)$ was instructed to the Z axis, the following relations are obtained.

$$K_1 + K_2 = \frac{1}{K'_S} - \frac{1}{K_S} + \frac{1}{K_Z} \tag{9}$$

$$C - \frac{2B}{K_S} + \frac{6A}{K_S^2} = C - \frac{2B}{K'_S} + \tag{10}$$

$$\frac{6A}{K'_S{}^2} + \frac{2B}{K'_S} - \frac{2B}{K_S} + \frac{2B}{K_Z} -$$

$$6A\left(\frac{K_1}{K'_S} - K_3\right) - \frac{2B}{K_Z} + \frac{6A}{K_S K_Z}$$

$$\frac{K_1}{K'_S} - K_3 = \frac{1}{K'_S{}^2} - \frac{1}{K_S^2} + \frac{1}{K_S K_Z} \tag{11}$$

$$D - \frac{C}{K_S} + \frac{2B}{K_S^2} - \frac{6A}{K_S^3} = D - \frac{C}{K'_S} + \tag{12}$$

$$\frac{2B}{K'_S{}^2} - \frac{6A}{K'_S{}^3} + \frac{C}{K'_S} - \frac{C}{K_S} +$$

$$\frac{C}{K_Z} - \frac{2B}{K'_S{}^2} + \frac{2B}{K_S^2} - \frac{2B}{K_S K_Z} +$$

$$\frac{6AK_3}{K'_S{}^2} - \frac{C}{K_Z} + \frac{2B}{K_S K_Z} + \frac{6A}{K_S^2 K_Z}$$

The following equation is obtained by substituting the equations (8), (9), and (10) for the equation (11).

$$-\frac{6A}{K_S^3} = -\frac{6A}{K'_S{}^3} + \frac{6AK_3}{K'_S{}^2} + \frac{6A}{K'_S{}^2K_Z}K_3 = \qquad (13)$$

$$K'_S{}^2\left(\frac{1}{K'_S{}^3} - \frac{1}{K_S^3} + \frac{1}{K_S^2K_Z}\right)$$

In general, when an inverter drive is employed as the speed control apparatus of the first servo system, it takes tens of seconds to raise the number of revolutions of the servo motor to a few thousand revolutions per minute at constant acceleration/deceleration when the system is started, and a drive unit with a capacity several times larger than the rating is needed for the acceleration/deceleration torque alone in order to bring up the system into a constant state in a few seconds.

The constant power control makes it possible to improve the energy efficiency without using an inverter drive with a large capacity, because the number of revolutions of the servo motor can be raised to a few thousand revolutions per minute in a few seconds by means of an inverter drive with a normal capacity.

Accordingly, in the control of the main axis of a machine tool, the constant power control becomes indispensable. However, a servo tracking control method of the prior art has the drawback that positional synchronizing errors between two axes during acceleration/deceleration become extremely large.

As mentioned above, by generating the first, second and third compensation signals from the information of the position and speed of the first servo system and compensating the speed error of the second servo system by the first, second and third compensation signals, position synchronizing errors can be eliminated and an accurate synchronizing control between two servo systems having different response characteristics can be executed even in cases where the acceleration and deceleration of the first servo system are executed at constant power control.

DETAILED DESCRIPTION OF THE PREFERRED EMBODIMENT

Figure 1:
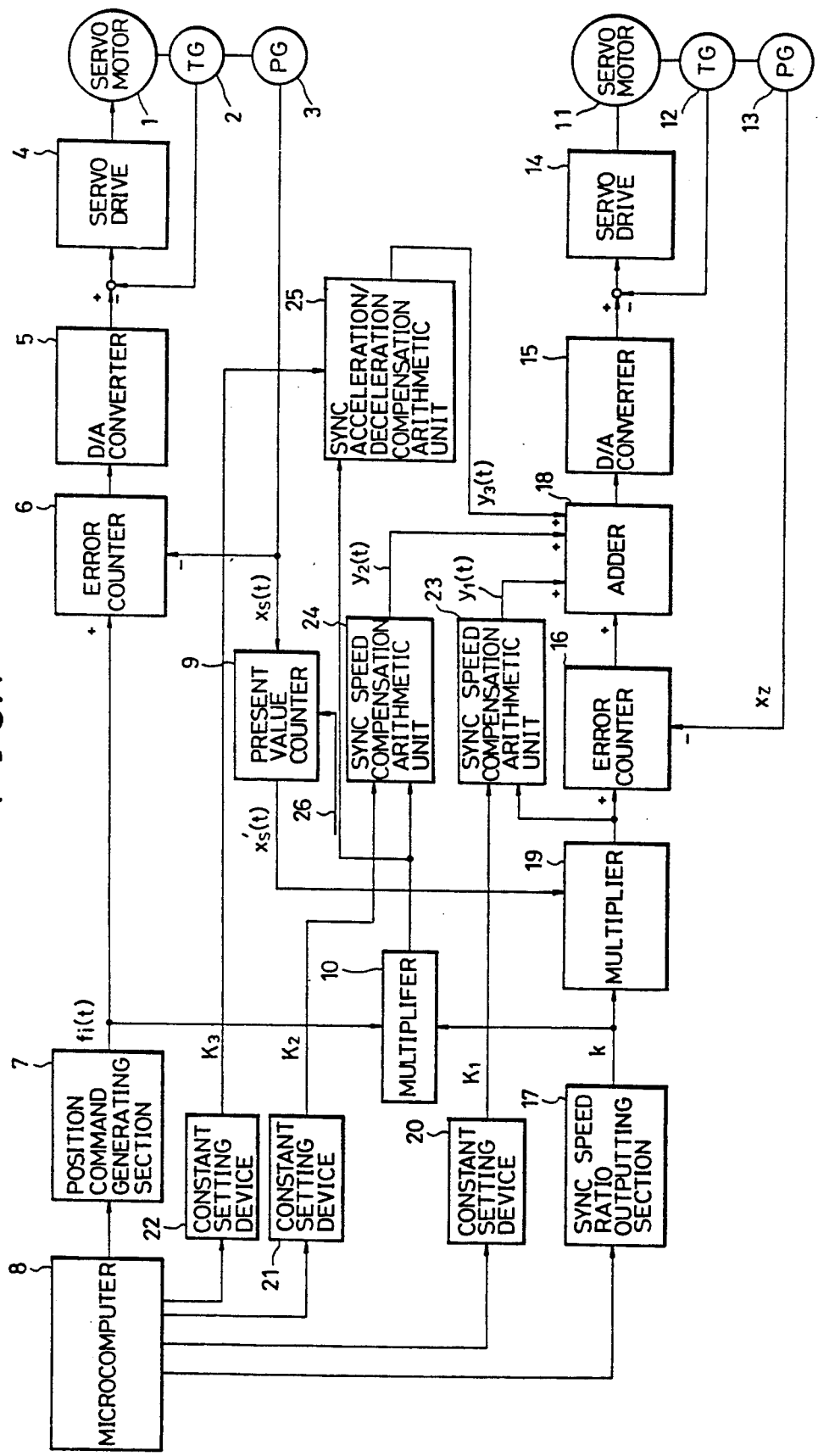
FIG. 1 is a block diagram of a servo system to which a tracking control method between two servo systems according to the invention was applied.
Figure 2:
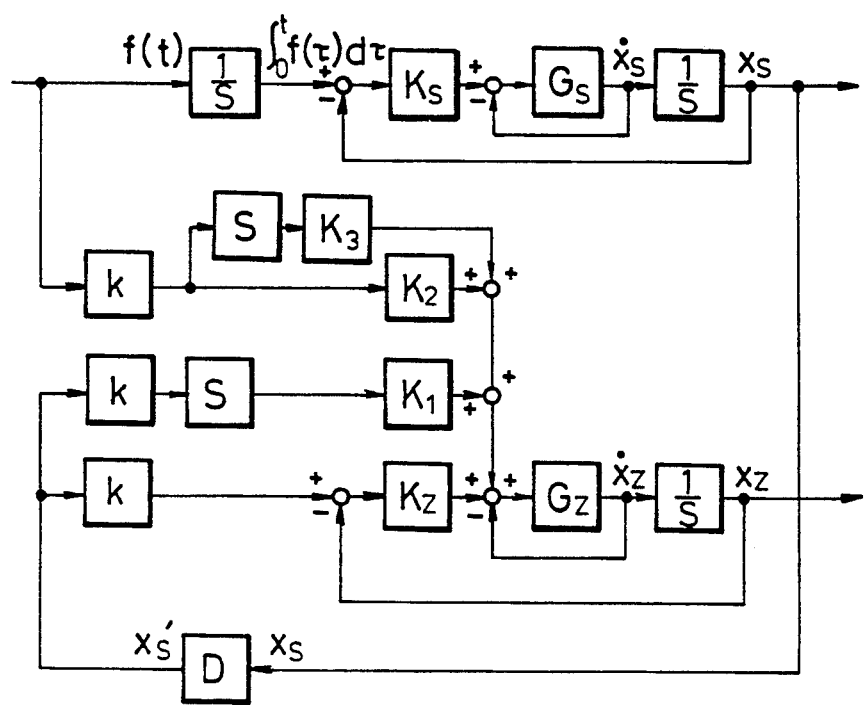
FIGS. 2 to 5 are principle diagrams of the invention.
Figure 3:
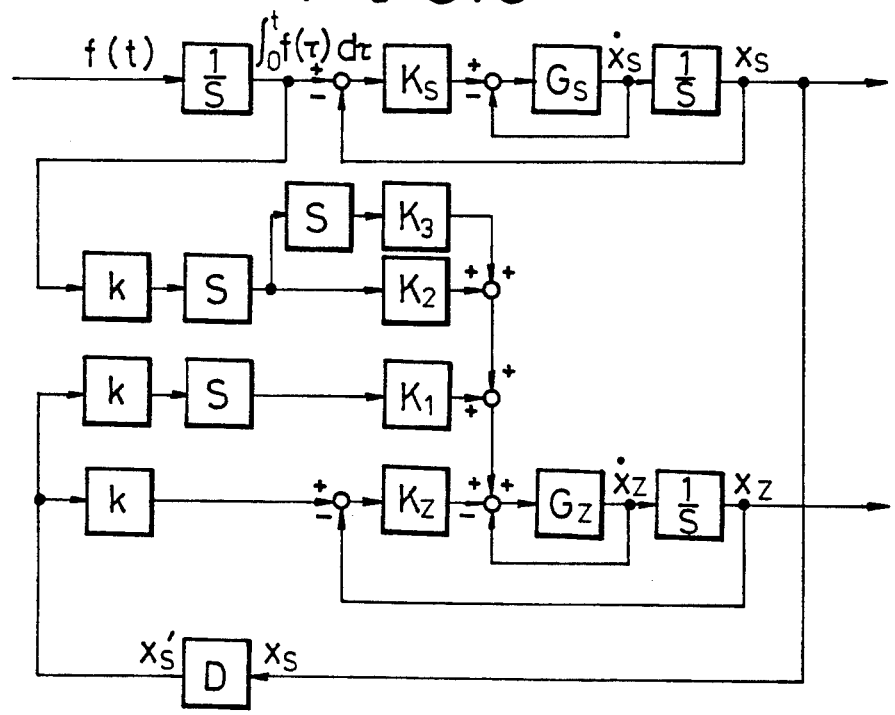
Figure 4:
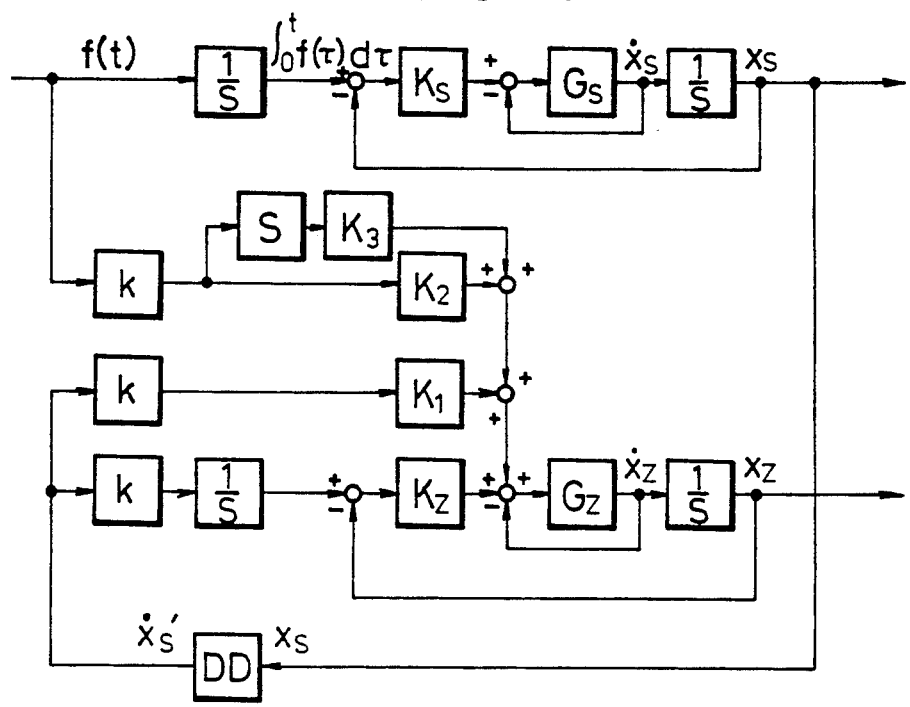
Figure 5:
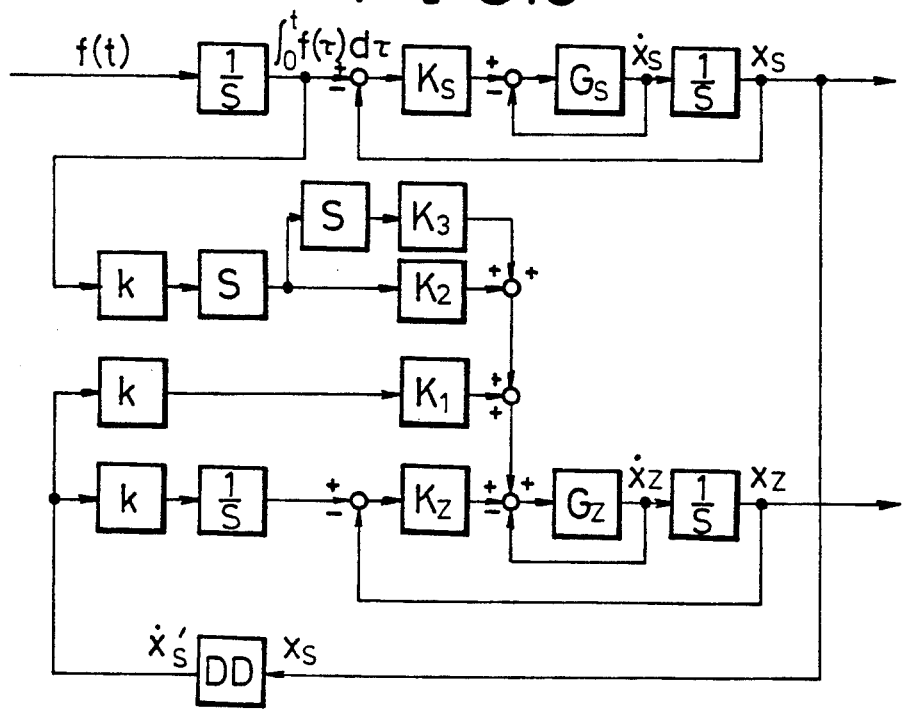
Figure 6:
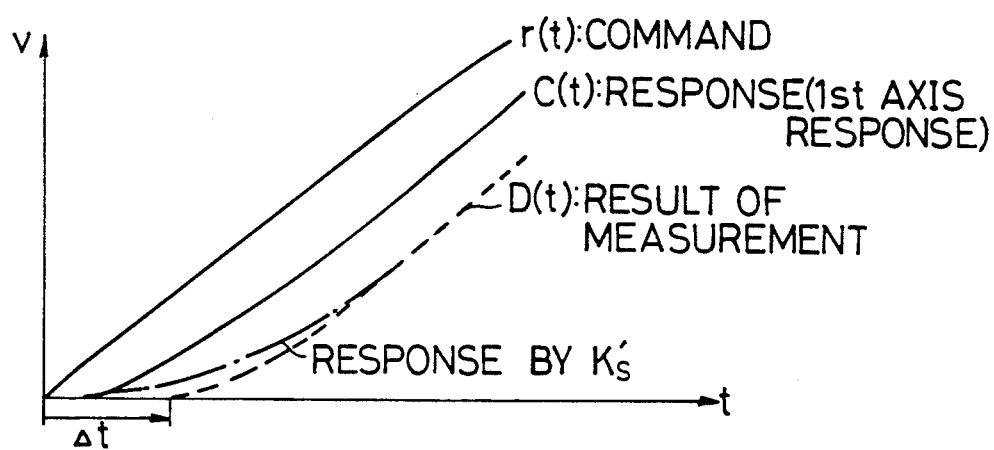
FIG. 6 is a command and measurement waveform diagram for explaining the principle of the invention.

FIG. 1 is a block diagram of an embodiment of a servo system to which a tracking control method between two servo systems according to the invention was applied.

The system is used in a tapping machine. The servo system of the S axis drive (main drive shaft) is composed of a servo motor 1, a tachogenerator 2, a pulse generator 3, a servo drive 4, a D/A converter 5, a error counter 6, and a position command generating section 7. The servo system of the Z axis drive (table drive shaft) is composed of a servo motor 11, a tachogenerator 12, a pulse generator 13, a servo drive 14, a D/A converter 15, an adder 18, a error counter 16, and a multiplier 19.

The compensation coefficients $K_1$, $K_2$, and $K_3$ are set into constant setting devices 20, 21, and 22 by a microcomputer 8, respectively. The constant k is set into a synchronization speed ratio outputting section 17 by the microcomputer 8. A present value counter 9 samples the position detection signal $X_S(t)$ of the servo system of the S axis drive by a sampling signal 26 and generates the position signal $X'_S(t)$. The position signal $X'_S(t)$ is multiplied with the constant k by the multiplier 19 and becomes the position command signal for the servo system of the Z axis. The difference between the position command signal and the preceeding read-out value is calculated by a synchronizing speed compensation arithmetic unit 23. After that, the difference is multiplied with the compensation coefficient $K_1$ and becomes a first compensation signal $y_1(t)$. A multiplier 10 multiplies the constant k by a position command signal $$\int_0^t f(\tau)d\tau$$

of the servo system of the S axis drive which is generated from the position command generating section 7 and, thereafter, differentiates the multiplied signal. The output of the multiplier 10 is multiplied with the compensation coefficient $K_2$ by a synchronizing speed compensation arithmetic unit 24 and becomes a second compensation signal $y_2(t)$. The output of the multiplier 10 is differentiated by a synchronizing acceleration/deceleration compensation arithmetic unit 25 and is, thereafter,, multiplied with the compensation coefficient $K_3$ and becomes a third compensation signal $y_3(t)$.

The first, second and third compensation signals $y_1(t)$, $y_2(t)$, and $y_3(t)$ are added to the output of the error counter 16 by the adder 18. The delay time which is mainly caused by the sampling and calculation processes is compensated by the first compensation signal $y_1(t)$. The delay time which is mainly caused at the start of a command is compensated by the second compensation signal $y_2(t)$. Sudden torque changes are compensated by the third compensation signal $y_3(t)$. The output signal of the adder 18 is supplied to the D/A converter 15.

The compensation coefficients $K_1$, $K_2$, and $K_3$ are determined by the delay due to the sampling process, the delay due to the calculation process, and the position loop gains of the S and Z axes.

The delay times due to the sampling and calculation process are made constant by the sampling time. By setting the compensation coefficients $K_1$, $K_2$, and $K_3$ by the position loop gains of the Z and S axes, the accurate tracking control between two servo systems can be performed. Thus, tapping work at higher speed and accuracy than in conventional methods can be achieved.

The present invention is not limited to only tapping machines but can also be applied to double-axis drive of electric trains, gear shaving, two point suspension cranes, both-end driving of ball screws and the like.

While a preferred embodiment of the invention has been described using specific terms, such description is for illustrative only, and it is to be understood that changes and variations may be made without departing from the spirit or scope of the following claims.

What is claimed is:

1. A tracking control method between the servo systems comprising the steps of:

sampling a position detection signal of the first servo system having a speed control loop as a minor loop, subjecting said position detection signal to a digital calculation, and setting the resultant signal to a position command signal of the second servo system having a speed control loop as a minor loop, thereby allowing the second servo system to track the positional response of the first servo system, the improvement comprising the further steps of:

generating a first compensation signal according to speed information obtained from the position detection signal of the first servo system, a second compensation signal according to the speed information obtained from the command signal of the speed of the first servo system, and a third compensation signal according to the derivative of said speed information, and compensating the speed error of the speed control loop of the second servo system by the first, second and third compensation signals.

2. A method according to claim 1, wherein said compensating step comprises a step of adding the sum of the first, second and third compensation signals to a speed value of the speed control loop of the second servo system as a compensation signal of said speed value, thereby compensating the speed error.

3. A method according to claim 1, wherein said compensating step comprises a step of adding the sum of the first, second and third compensation signals to a speed feedback value of the speed control loop of the second servo system as a compensation signal of said speed feedback value, thereby compensating the speed error.

4. A method according to claim 1, wherein said compensating step comprises a step of amending the gain of the control apparatus which generates the speed command signal of the speed control loop of the second servo system by the sum of the first, second and third compensation signals, thereby compensating the speed error.

5. A tracking control method between two servo systems comprising the steps of:

sampling a position detection signal of the first servo system having a speed control loop as a minor loop, subjecting said position detection signal to a digital calculation, and setting the resultant signal to a position command signal of the second servo system having a speed control loop as a minor loop, thereby allowing the second servo system to track the positional response of the first servo system, the improvement comprising the further steps of:

generating a first compensation signal according to speed information obtained from the position detection signal of the first servo system, a second compensation signal according to the speed information obtained from the command signal of the position of the first servo system, and a third compensation signal according to the derivative of said speed information, and compensating the speed error of the speed control loop of the second servo system by the first, second and third compensation signals.

6. A method according to claim 5, wherein said compensating step comprises a step of adding the sum of the first, second and third compensation signals to a speed value of the speed control loop of the second servo system as a compensation signal of said speed value, thereby compensating the speed error.

7. A method according to claim 5, wherein said compensating step comprises a step of adding the sum of the first, second and third compensation signals to a speed feedback value of the speed control loop of the second servo system as a compensation signal of said speed feedback value, thereby compensating the speed error.

8. A method according to claim 5, wherein said compensating step comprises a step of amending the gain of the control apparatus which generates the speed command signal of the speed control loop of the second servo system by the sum of the first, second and third compensation signals, thereby compensating the speed error.

9. A tracking control method between two servo systems comprising the steps of:

sampling a position detection signal of the first servo system having a speed control loop as a minor loop, subjecting said position detection signal to a digital calculation, and setting the resultant signal to a position command signal of the second servo system having a speed control loop as a minor loop, thereby allowing the second servo system to track the positional response of the first servo system, the improvement comprising the further steps of:

generating a first compensation signal according to speed information obtained from the position detection signal of the first servo system, a second compensation signal according to the speed information obtained from the command signal of the speed of the first servo system and speed information obtained from the command signal of the position of the first servo system, and a third compensation signal according to the derivative of said speed information, and compensating the speed error of the speed control loop of the second servo system by the first, second and third compensation signals.

10. A method according to claim 9, wherein said compensating step comprises a step of adding the sum of the first, second and third compensation signal to a speed value of the speed control loop of the second servo system as a compensation signal of said speed value, thereby compensating the speed error.

11. A method according to claim 9, wherein said compensating step comprises a step of adding the sum of the first, second and third compensation signals to a speed feedback value of the speed control loop of the second servo system as a compensation signal of said speed feedback value, thereby compensating the speed error.

12. A method according to claim 9, wherein said compensating step comprises a step of amending the gain of the control apparatus which generates the speed command signal of the speed control loop of the second servo system by the sum of the first, second and third compensation signals, thereby compensating the speed error.

13. A tracking control method between two servo systems comprising the steps of:

sampling a position detection signal of the first servo system having a speed control loop as a minor loop, subjecting said position detection signal to a digital calculation to obtain a speed signal, integrating the speed signal, and setting the resultant signal to a position command signal of the second servo system having a speed control loop as a minor loop, thereby allowing the second servo system to track the positional response of the first servo system, the improvement comprising the further steps of:

generating a first compensation signal according to the position detection signal of the first servo system, a second compensation signal according to speed information obtained from the command signal of the speed of the first servo system, and a third compensation signal according to the derivative of said speed information and compensating the speed error of the speed control loop of the second servo system by the first, second and third compensation signals.

14. A method according to claim 13, wherein said compensation step comprises a step of adding the sum of the first, second and third compensation signals to a speed value of the speed control loop of the second servo system as a compensation signal of said speed value, thereby compensating the speed error.

15. A method according to claim 13, wherein said compensating step comprises a step of adding the sum of the first, second and third compensation signals to a speed feedback value of the speed control loop of the second servo system as a compensation signal of said speed feedback value, thereby compensating the speed error.

16. A method according to claim 13, wherein said compensating step comprises a step of amending the gain of the control apparatus which generates the speed command signal of the speed control loop of the second servo system by the sum of the first, second and third compensation signals, thereby compensating the speed error.

17. A tracking control method between two servo systems comprising the steps of:

sampling a position detection signal of the first servo system having a speed control loop as a minor loop, subjecting said position detection signal to a digital calculation to obtain a speed signal, integrating the speed signal, and setting the resultant signal to a position command signal of the second servo system having a speed control loop as a minor loop, thereby allowing the second servo system to track the positional response of the first servo system, the improvement comprising the further steps of:

generating a first compensation signal according to the position detection signal of the first servo system, a second compensation signal according to speed information obtained from the command signal of the position of the first servo system, and a third compensation signal according to the derivative of said speed information and compensating the speed error of the speed control loop of the second servo system by the first, second and third compensation signals.

18. A method according to claim 17, wherein said compensating step comprises a step of adding the sum of the first, second and third compensation signals to a speed value of the speed control loop of the second servo system as a compensation signal of said speed value, thereby compensating the speed error.

19. A method according to claim 17, wherein said compensating step comprises a step of adding the sum of the first, second and third compensation signals to a speed feedback value of the speed control loop of the second servo system as a compensation signal of said speed feedback value, thereby compensating the speed error.

20. A method according to claim 17, wherein said compensating step comprises a step of amending the gain of the control apparatus which generates the speed command signal of the speed control loop of the second servo system by the sum of the first, second and third compensation signals, thereby compensating the speed error.

21. A tracking control method between two servo systems comprising the steps of:

sampling a position detection signal of the first servo system having a speed control loop as a minor loop, subjecting said position detection signal to a digital calculation to obtain a speed signal, integrating the speed control and setting the resultant signal to a position command signal of the second servo system having a speed control loop as a minor loop, thereby allowing the second servo system to track the positional response of the first servo system, the improvement comprising the further steps of:

generating a first compensation signal according to the position detection signal of the first servo system, a second compensation signal according to speed information obtained from the command signal of the speed of the first servo system and speed information obtained from a command signal of the position of the first servo system, and a third compensation signal according to the derivative of said speed information and compensating the speed error of the speed control loop of the second servo system by the first, second and third compensation signals.

22. A method according to claim 21, wherein said compensating step comprises a step of adding the sum of the first, second and third compensation signals to a speed value of the speed control loop of the second servo system as a compensation signal of said speed value, thereby compensating the speed error.

23. A method according to claim 21, wherein said compensating step comprises a step of adding the sum of the first, second and third compensation signals to a speed feedback value of the speed control loop of the second servo system as a compensation signal of said speed feedback value, thereby compensating the speed error.

24. A method according to claim 21, wherein said compensating step comprises a step of amending the gain of the control apparatus which generates a speed command signal of the speed control loop of the second servo system by the sum of the first, second, and third compensation signals, thereby compensating the speed error.

* * * * *